(12) United States Patent
Mager et al.

(10) Patent No.: US 11,279,790 B2
(45) Date of Patent: Mar. 22, 2022

(54) PROCESS FOR PRODUCING POLYISOCYANURATE PLASTICS BY MEANS OF PHOSPHINE CATALYSIS

(71) Applicant: Covestro Deutschland AG, Leverkusen (DE)

(72) Inventors: Dieter Mager, Leverkusen (DE); Hans-Josef Laas, Odenthal (DE); Mathias Matner, Neuss (DE); Dirk Achten, Leverkusen (DE); Heiko Hocke, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 168 days.

(21) Appl. No.: 16/328,799

(22) PCT Filed: Aug. 29, 2017

(86) PCT No.: PCT/EP2017/071603
§ 371 (c)(1),
(2) Date: Feb. 27, 2019

(87) PCT Pub. No.: WO2018/041800
PCT Pub. Date: Mar. 8, 2018

(65) Prior Publication Data
US 2019/0202963 A1 Jul. 4, 2019

(30) Foreign Application Priority Data
Sep. 2, 2016 (EP) .................................... 16187010

(51) Int. Cl.
*C08G 18/02* (2006.01)
*C09D 175/04* (2006.01)
*C08G 18/16* (2006.01)
*C08G 18/79* (2006.01)
*B01J 31/24* (2006.01)

(52) U.S. Cl.
CPC ............ *C08G 18/022* (2013.01); *B01J 31/24* (2013.01); *C08G 18/168* (2013.01); *C08G 18/792* (2013.01); *C09D 175/04* (2013.01); *C08G 2115/02* (2021.01)

(58) Field of Classification Search
CPC .. C08G 18/022; C08G 18/168; C08G 18/792; C08G 2105/02; C08G 2115/02; C09D 175/04; B01J 31/24
See application file for complete search history.

(56) References Cited

U.S. PATENT DOCUMENTS

| | | |
|---|---|---|
| 3,211,703 A | 10/1965 | Gilman et al. |
| 3,996,223 A | 12/1976 | Gupta et al. |
| 4,255,569 A | 3/1981 | Müller et al. |
| 4,613,686 A | 9/1986 | König et al. |
| 4,614,785 A * | 9/1986 | Richter .................. C08G 18/79 528/45 |
| 4,837,359 A | 6/1989 | Woynar et al. |
| 4,960,848 A | 10/1990 | Scholl et al. |
| 4,994,541 A | 2/1991 | Dell et al. |
| 5,064,960 A | 11/1991 | Pedain et al. |
| 5,076,958 A | 12/1991 | Pedain et al. |
| 5,237,058 A | 8/1993 | Laas et al. |
| 5,914,383 A | 6/1999 | Richter et al. |
| 6,090,939 A | 7/2000 | Richter et al. |
| 6,133,397 A | 10/2000 | O'Connor et al. |
| 6,765,111 B1 | 7/2004 | Pedain et al. |
| 7,067,654 B2 | 6/2006 | Richter et al. |
| 7,709,680 B2 | 5/2010 | Richter et al. |
| 2017/0044296 A1 | 2/2017 | Harada |

FOREIGN PATENT DOCUMENTS

| | | |
|---|---|---|
| DE | 1954093 A1 | 6/1970 |
| DE | 1670666 A1 | 7/1971 |
| DE | 2414413 A1 | 10/1975 |
| DE | 2452532 A1 | 5/1976 |
| DE | 2641380 A1 | 3/1978 |
| DE | 3700209 A1 | 7/1988 |
| DE | 3900053 A1 | 7/1990 |

(Continued)

OTHER PUBLICATIONS

International Search Report for PCT/EP2017/071603 dated Oct. 11, 2017.
Written Opinion of the International Searching Authority for PCT/EP2017/071603 dated Oct. 11, 2017.

*Primary Examiner* — Rabon A Sergent
(74) *Attorney, Agent, or Firm* — Faegre Drinker Biddle & Reath LLP

(57) ABSTRACT

The present invention relates to process for producing polyisocyanurate plastics, comprising the following steps: a) providing a polyisocyanate composition A) which comprises oligomeric polyisocyanates and is low in monomeric diisocyanates, "low in monomeric diisocyanates" meaning that the polyisocyanate composition A) has a content of monomeric diisocyanates of not more than 20% by weight, b) catalytically trimerizing the polyisocyanate composition A) using at least one tertiary organic phosphine catalyst B). The invention further relates to polyisocyanurate plastics obtainable by the process according to the invention, to coatings, films, semifinished products and mouldings comprising or consisting of the polyisocyanurate plastic according to the invention, and to the use of the polyisocyanurate plastics according to the invention for production of coatings, films, semifinished products and mouldings.

9 Claims, No Drawings

(56) References Cited

FOREIGN PATENT DOCUMENTS

| | | |
|---|---:|---|
| DE | 3928503 A1 | 3/1991 |
| DE | 102004038784 A1 | 2/2006 |
| EP | 0150769 A2 | 8/1985 |
| EP | 330966 A2 | 9/1989 |
| EP | 0336205 A2 | 10/1989 |
| EP | 0339396 A1 | 11/1989 |
| EP | 0481318 A1 | 4/1992 |
| EP | 496208 A2 | 7/1992 |
| EP | 0798299 A1 | 10/1997 |
| EP | 0962455 A1 | 12/1999 |
| EP | 1422223 A1 | 5/2004 |
| EP | 1982979 A1 | 10/2008 |
| GB | 1145952 A | 3/1969 |
| GB | 1244416 A | 9/1971 |
| JP | 2001098042 A | 4/2001 |
| WO | WO-2015166983 A1 | 11/2015 |

\* cited by examiner

PROCESS FOR PRODUCING POLYISOCYANURATE PLASTICS BY MEANS OF PHOSPHINE CATALYSIS

CROSS-REFERENCE TO RELATED APPLICATIONS

This application is a national stage application (under 35 U.S.C. § 371) of PCT/EP2017/071603, filed Aug. 29, 2017, which claims benefit of European Application No. 16187010.0, filed Sep. 2, 2016, both of which are incorporated herein by reference in their entirety.

The invention relates to a process for producing polyisocyanurate plastics, to the polyisocyanurate plastics obtainable by this process, and to coatings, films, semifinished products or mouldings produced therefrom.

Polymers with polyisocyanurate structure are known for their good thermal stability and flame resistance. Polyisocyanurate foams based on the aromatic diphenylmethane 4,4'-diisocyanate (MDI) are widely used, for example, because of their very low thermal conductivity, especially as high-performance insulating materials. However, MDI polyisocyanurates, as is commonly known from aromatic polyurethanes, have only low light stability and have a tendency to significant yellowing.

There has therefore been no lack of attempts to synthesize polyisocyanurate plastics based on aliphatic lightfast isocyanates.

For example, *European Polymer Journal, vol.* 16, 147-148 (1980) describes the catalytic trimerization of monomeric 1,6-diisocyanatohexane (HDI) at 40° C. to give a clear transparent polyisocyanurate plastic free of isocyanate groups. For this purpose, however, 15% by weight of dibutyltin dimethoxide are required as trimerization catalyst. *European Polymer Journal, Vol.* 16, 831-833 (1980) describes the full trimerization of monomeric HDI to give a polyisocyanurate at a temperature of 140'C using 6% by weight of tributyltin oxide as catalyst.

*Journal of Polymer Science Part A: Polymer Chemistry* 2013, 51, 2631-2637 describes the preparation of optically transparent polyisocyanurate films based on monomeric HDI/MDI mixtures with sodium p-toluenesulphinate as catalyst. Using exclusively monomeric HDI as starting diisocyanate, it is not, however, possible to obtain clear films with this catalyst, since the reaction mixture foams significantly because of the extreme exothermicity of the trimerization reaction. According to this publication, the synthesis of a pure HDI polyisocyanurate was possible only in a test tube, on the mmol scale and in organic solution after complex workup.

U.S. Pat. No. 3,211,703 describes solid crosslinked polymers consisting of at least ten successive isocyanurate structures joined via divalent aliphatic groups, preferably hexamethylene chains. However, the specific working examples in this patent specification describe exclusively copolymers of HDI with styrene oxide.

JP 2001-098042 provides polyisocyanurates proceeding from monomeric cycloaliphatic bis(isocyanatomethyl)norbornane (NBDI) having a maximum isocyanate group content of 13% in the end product and prepared using a catalyst system consisting of potassium fluoride and a complexing agent containing ethylene oxide groups.

The thesis by Theo Flipsen: "Design, synthesis and properties of new materials based on densely crosslinked polymers for polymer optical fiber and amplifier applications", Rijksuniversiteit Groningen, 2000 describes the trimerization of monomeric HDI with a neodymium/crown ether complex as catalyst. The polyisocyanurate obtained, which is said to have good optical, thermal and mechanical properties, was examined in the context of the thesis for its suitability for optical applications, especially as polymeric optical fibre.

However, the processes known from the prior art for preparation of polyisocyanurate plastics from monomeric aliphatic diisocyanates have the fundamental disadvantage that the trimerization catalysts used also greatly accelerate the reaction of the isocyanate groups with water. For the avoidance of blister formation by the carbon dioxide formed, the trimerization reactions have to be conducted under controlled conditions with absolute exclusion of moisture. Blister- and turbidity-free polyisocyanurate plastics as required for optical applications, for example, can be prepared by the known processes exclusively in closed systems under a protective gas atmosphere.

WO 2015/166983 describes the use of polyisocyanurate plastics for encapsulation of LEDs. There are no pointers in this publication to the specific trimerization catalysts used in the process of the present invention and to their low sensitivity to moisture.

U.S. Pat. No. 6,133,397 describes the production of coatings by crosslinking of oligomeric isocyanates. Dibutyltin dilaurate is present as catalyst in all the experiments disclosed; it is not shown that the catalysts mentioned in column 5 of table 1 bring about crosslinking of monomeric or oligomeric isocyanates even without the addition of dibutyltin dilaurate, as shown in the present application. The phosphine oxides described therein are catalytically inactive as shown in EP 0 481 318, where the oxidation of phosphines to give the corresponding phosphine oxides is conducted in order to inactivate the catalyst. Likewise inactive, and consequently not encompassed by the present application, are phosphines having more than one phenyl radical. The combination of phosphines with dibutyltin dilaurate as catalyst, as shown in Example 3 of the present application, leads to the known problems of blister formation described above.

It was therefore an object of the present invention to provide a novel process for producing polyisocyanurate plastics with high thermal stability, which affords, in a simple manner and irrespective of the moisture content of the environment, even in open moulds, blister-free transparent shaped bodies that are especially also suitable for production of optical components.

This object is achieved in accordance with the invention. Advantageous configurations of the invention are specified in the dependent claims and are elucidated in detail hereinafter, as is the general concept of the present invention.

The invention provides a process for producing a polyisocyanurate plastic, comprising the following steps:

a) providing a polyisocyanate composition A) which comprises oligomeric polyisocyanates and is low in monomeric diisocyanates, "low in monomeric diisocyanates" meaning that the polyisocyanate composition A) has a content of monomeric diisocyanates of not more than 20% by weight, b) catalytically trimerizing the polyisocyanate composition A) using at least one tertiary organic phosphine catalyst B).

The invention also provides the polyisocyanurate plastics obtainable by this process and the use thereof for production of coatings, films, semifinished products or mouldings.

Particular preference is given to using the polyisocyanurate plastic obtainable by the process according to the invention for production of mouldings.

The invention described in detail hereinafter is based on the surprising observation that low-monomer oligomeric polyisocyanate compositions, through catalysis with tertiary organic phosphines, even under non-inert conditions, can be trimerized to give blister-free transparent polyisocyanurate plastics that have many advantageous properties and are especially suitable for optical applications and components. By the process according to the invention, blister-free trimerization is possible not only in the presence of air humidity but even in direct contact with liquid water, for example underwater.

Practical experiments have shown that, when the tertiary organic phosphine catalyst according to the invention was used, it was surprisingly possible to obtain the desired blister-free polyisocyanurate plastics only with the low-monomer reactants containing oligomeric polyisocyanate, and not from purely monomeric diisocyanates. The use of low-monomer oligonneric polyisocyanate compositions rather than monomeric diisocyanates as starting materials for production of polyisocyanurate plastics, in combination with the tertiary organic phosphine catalyst according to the invention, additionally has the advantage that, because of the relatively low isocyanate contents of the oligonneric reactants, a distinctly smaller amount of heat of reaction has to be removed during the curing, which especially also facilitates the production of large-volume components. Moreover, the use of low-monomer polyisocyanate compositions containing oligomeric polyisocyanates as oligonneric reactants for the trinnerization reaction also leads to a novel cross-linking structure in the polyisocyanurate plastic obtainable, which differs from the materials known from the prior art not only by freedom from blisters and the presence of the organic tertiary phosphine catalyst but also structurally.

A "polyisocyanurate plastic" as used herein is a plastic containing polyisocyanurate. It may also consist predominantly or entirely of a polyisocyanurate. Blends composed of polyisocyanurates and other plastics are likewise covered by the term "polyisocyanurate plastic" as used here.

When reference is made here to "plastic", this means a product which is very substantially dimensionally stable at room temperature—in contrast, for example, to gels or liquids. The term "plastic", as used here, includes all customary classes of plastic, i.e. in particular including thermosets, thermoplastics and elastomers.

A "polyisocyanurate" as used here is any molecule having a plurality of isocyanurate structural units, for example at least 10 isocyanurate structural units. A molecule having a single isocyanurate structural unit can be referred to as "isocyanurate".

A "moulding" in the context of this patent application is a body having, in its direction of lowest expansion, a thickness of at least 0.5 mm, preferably at least 1 mm, more preferably at least 2 mm and most preferably at least 5 mm. More particularly, a "moulding" as used here is not a film, coating or membrane.

The characteristic cyclic isocyanurate structural unit is shown in the following structural formula:

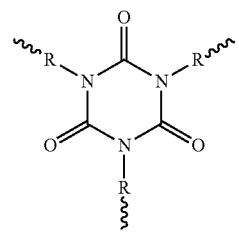

Isocyanurates and polyisocyanurates can be obtained by cyclotrimerization of polyisocyanates. The conventionally operated cyclotrimerization proceeding from monomeric diisocyanates is—as described above—a strongly exothermic reaction. This has to date considerably restricted the possible applications and the trimerization levels that are still achievable in technical terms and in an efficient manner.

The term "polyisocyanate" as used here is a collective term for compounds containing two or more isocyanate groups in the molecule (this is understood by the person skilled in the art to mean free isocyanate groups of the general structure —N═C═O). The simplest and most important representatives of these polyisocyanates are the diisocyanates. These have the general structure O═C═N—R—N═C═O where R typically represents aliphatic, alicyclic and/or aromatic radicals.

Where reference is made generally here to "polyisocyanates", this means monomeric and/or oligomeric polyisocyanates alike. For understanding of many aspects of the invention, however, it is important to distinguish between monomeric diisocyanates and oligomeric polyisocyanates. Where reference is made here to "oligomeric polyisocyanates", this means polyisocyanates formed from at least two monomeric diisocyanate molecules, i.e. compounds that constitute or contain a reaction product formed from at least two monomeric diisocyanate molecules.

The preparation of oligomeric polyisocyanates from monomeric diisocyanates is also referred to here as modification of monomeric diisocyanates. This "modification" as used here means the reaction of monomeric diisocyanates to give oligomeric polyisocyanates having, for example, uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

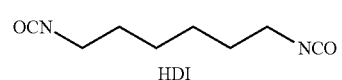

Reaction products which are formed from at least two HDI molecules and still have at least two isocyanate groups, by contrast, are "oligomeric polyisocyanates" within the context of the invention. Representatives of such "oligomeric polyisocyanates" are, proceeding from monomeric HDI, for example, HDI isocyanurate and HDI biuret, each of which are formed from three monomeric HDI units:

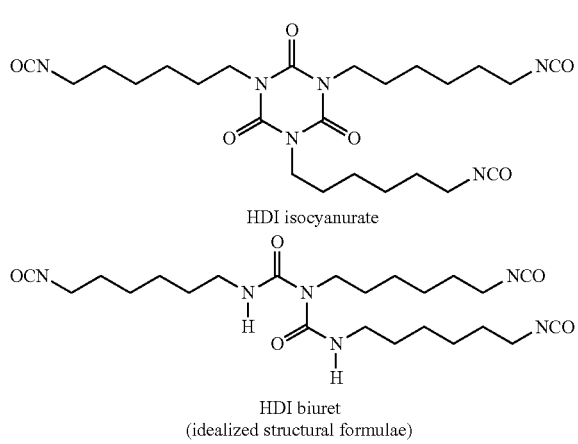

HDI isocyanurate

HDI biuret
(idealized structural formulae)

Processes for preparing oligomeric polyisocyanates are known to those skilled in the art and are described, for example, in the literature below. Oligomeric polyisocyanates are also commercially available as important precursors and intermediates, especially as hardener components, for polyurethane lacquers and adhesives.

"Polyisocyanate composition A)" in the context of the invention refers to the isocyanate component in the initial reaction mixture. In other words, this is the sum total of all compounds in the initial reaction mixture that have isocyanate groups. The polyisocyanate composition A) is thus used as reactant in the process according to the invention. When reference is made here to "polyisocyanate composition A)", especially to "providing the polyisocyanate composition A)", this means that the polyisocyanate composition A) exists and is used as reactant.

According to the invention, the polyisocyanate composition A) used as reactant in the trimerization is low in monomers (i.e. low in monomeric diisocyanates) and already contains oligomeric polyisocyanates. In one embodiment of the invention, the polyisocyanate composition A) consists entirely or to an extent of 80%, 85%, 90%, 95%, 98%, 99% or 99.5% by weight, based in each case on the weight of the polyisocyanate composition A), of oligomeric polyisocyanates. This content of oligomeric polyisocyanates is based on the polyisocyanate composition A), meaning that they are not formed, for instance, as intermediate during the process according to the invention, but are already present in the polyisocyanate composition A) used as reactant on commencement of the reaction.

"Low in monomers" and "low in monomeric diisocyanates" is used here synonymously in relation to the polyisocyanate composition A).

Results of particular practical relevance are established when the polyisocyanate composition A) has a proportion of monomeric diisocyanates in the polyisocyanate composition A) of not more than 20% by weight, especially not more than 15% by weight or not more than 10% by weight, based in each case on the weight of the polyisocyanate composition A). In the case of distinctly higher contents of monomeric isocyanates, it may be the case that the crosslinking reaction stops before all the free isocyanate groups have been consumed.

Preferably, the polyisocyanate composition A) has a content of monomeric diisocyanates of not more than 5% by weight, especially not more than 2.0% by weight, more preferably not more than 1.0% by weight, based in each case on the weight of the polyisocyanate composition A). Particularly good results are established when the polymer composition A) is essentially free of monomeric diisocyanates. "Essentially free" means here that the content of monomeric diisocyanates is not more than 0.5% by weight, based on the weight of the polyisocyanate composition A).

It is essential to the invention that the polyisocyanate composition A) used is low in monomers. In practice, this can especially be achieved by using, as polyisocyanate composition A), oligomeric polyisocyanates, in the preparation of which the actual modification reaction has been followed in each case by at least one further process step for removal of the unconverted excess monomeric diisocyanates. This removal of monomers can be effected in a particularly practical manner by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In a preferred embodiment of the invention, the polyisocyanate composition A) according to the invention is obtained by modifying monomeric diisocyanates with subsequent removal of unconverted monomers.

The processes described in the prior art for production of polyisocyanurate plastics in which very substantially monomeric diisocyanates or monomer-rich polyisocyanate compositions are used as reactants require complete exclusion of moisture during the trimerization reaction for avoidance of reaction blisters and turbidity.

The inventive use or the "provision" of a low-monomer polyisocyanate composition A) already containing oligomeric polyisocyanates, by contrast, in the case of use of organic tertiary phosphines as trimerization catalysts, surprisingly leads to transparent, turbidity- and blister-free products even under non-inert conditions and even in direct contact with water. The lower exothermicity of the reaction according to the invention additionally makes it possible to obtain polyisocyanurate plastics with a high conversion level.

Preferably, in the trimerization reaction according to the invention, no monomeric diisocyanate is used. In a particular embodiment of the invention, however, the polyisocyanate composition A) may comprise an extra monomeric diisocyanate. In this context, "extra monomeric diisocyanate" means that it is a monomeric diisocyanate different from the monomeric diisocyanates which have been used for preparation of the oligomeric polyisocyanates present in the polyisocyanate composition A). Addition of extra monomeric diisocyanate may be advantageous for achievement of specific technical effects, for example a particular hardness. Results of particular practical relevance are established when the polyisocyanate composition A) has a proportion of extra monomeric diisocyanate in the polyisocyanate composition A) of not more than 20% by weight, especially not more than 15% by weight or not more than 10% by weight, based in each case on the weight of the polyisocyanate composition A). Preferably, the polyisocyanate composition A) has a content of extra monomeric diisocyanate of not more than 5% by weight, especially not more than 2.0% by weight, more preferably not more than 1.0% by weight, based in each case on the weight of the polyisocyanate composition A). The total content of monomeric diisocyanate in the polyisocyanate composition A) should always be not more than 20% by weight, as described above.

In a further particular embodiment of the process according to the invention, the polyisocyanate composition A) may contain monomeric monoisocyanates or monomeric isocyanates having an isocyanate functionality greater than two, i.e. having more than two isocyanate groups per molecule. The addition of monomeric monoisocyanates or monomeric isocyanates having an isocyanate functionality greater than two has been found to be advantageous in order to influence the network density of the polyisocyanurate plastic. Results of particular practical relevance are established when the polyisocyanate composition A) has a proportion of monomeric monoisocyanates and/or monomeric isocyanates having an isocyanate functionality greater than two in the polyisocyanate composition A) of not more than 20% by weight, especially not more than 15% by weight or not more than 10% by weight, based in each case on the weight of the polyisocyanate composition A). Preferably, the polyisocyanate composition A) has a content of monomeric monoisocyanates and/or monomeric isocyanates having an isocyanate functionality greater than two of not more than 5% by weight, especially not more than 2.0% by weight, more preferably not more than 1.0% by weight, based in each case on the weight of the polyisocyanate composition A). Preferably, no monomeric monoisocyanate or monomeric isocyanate having an isocyanate functionality greater than two is used in the trimerization reaction according to the invention.

The low-monomer polyisocyanate composition A) and the oligomeric polyisocyanates present therein are typically obtained by modifying simple aliphatic, cycloaliphatic, araliphatic and/or aromatic monomeric diisocyanates or mixtures of such monomeric diisocyanates.

The oligomeric polyisocyanates may, in accordance with the invention, especially have uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

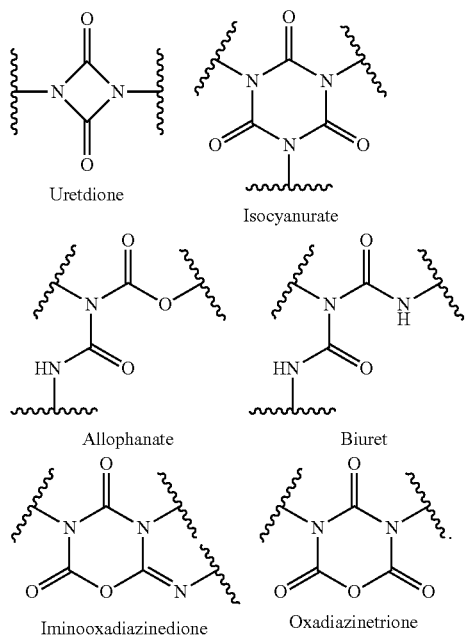

It has been found that, surprisingly, it can be advantageous to use oligomeric polyisocyanates that are a mixture of at least two oligomeric polyisocyanates, the at least two oligomeric polyisocyanates differing in terms of structure. This structure is preferably selected from the group consisting of uretdione, isocyanurate, allophanate, biuret, iminooxadiazinedione and oxadiazinetrione structure, and mixtures thereof. Particularly by comparison with trimerization reactions with oligomeric polyisocyanates of just one defined structure, starting mixtures of this kind can lead to an effect on the Tg value, which is advantageous for many applications.

Preference is given to using, in the process according to the invention, a polyisocyanate composition A) consisting of at least one oligomeric polyisocyanate having biuret, allophanate, isocyanurate and/or iminooxadiazinedione structure and mixtures thereof.

In another embodiment, the polyisocyanate composition A) is one containing only a single defined oligomeric structure, for example exclusively or for the most part isocyanurate structure. In general, as a result of the preparation, however, several different oligomeric structures are always present alongside one another in the polyisocyanate composition A).

In the context of the present invention, a polyisocyanate composition A) is regarded as a polyisocyanate composition of a single defined oligomeric structure when an oligomeric structure selected from uretdione, isocyanurate, allophanate, biuret, iminooxadiazinedione and/or oxadiazinetrione structure is present to an extent of at least 50 mol %, preferably 60 mol %, more preferably 70 mol %, especially preferably 80 mol % and particularly 90 mol %, based in each case on the sum total of the oligomeric structures from the group consisting of uretdione, isocyanurate, allophanate, biuret, iminooxadiazinedione and oxadiazinetrione structure present in the polyisocyanate composition A).

In a further embodiment, the oligomeric polyisocyanates are those which have mainly an isocyanurate structure and which may contain the abovementioned uretdione, allophanate, biuret, iminooxadiazinedione and/or oxadiazinetrione structure only as by-products. Thus, one embodiment of the invention envisages the use of a polymer composition A) of a single defined oligomeric structure, the oligomeric structure being an isocyanurate structure and being present to an extent of at least 50 mol %, preferably 60 mol %, more preferably 70 mol %, especially preferably 80 mol % and particularly 90 mol %, based in each case on the sum total of the oligomeric structures from the group consisting of uretdione, isocyanurate, allophanate, biuret, iminooxadiazinedione and oxadiazinetrione structure present in the polyisocyanate composition A).

It is likewise possible in accordance with the invention to use oligomeric polyisocyanates having very substantially no isocyanurate structure, and containing mainly at least one of the abovementioned uretdione, allophanate, biuret, iminooxadiazinedione and/or oxadiazinetrione structure types. In a particular embodiment of the invention, the polyisocyanate composition A) consists to an extent of 50 mol %, preferably 60 mol %, more preferably 70 mol %, especially preferably 80 mol % and particularly 90 mol %, based in each case on the sum total of the oligomeric structures from the group consisting of uretdione, isocyanurate, allophanate, biuret, iminooxadiazinedione and oxadiazinetrione structure present in the polyisocyanate composition A), of oligomeric polyisocyanates having a structure type selected from the group consisting of uretdione, allophanate, biuret, iminooxadiazinedione and/or oxadiazinetrione structure.

A further embodiment of the invention envisages the use of a low-isocyanurate polyisocyanate composition A) having, based on the sum total of the oligomeric structures from the group consisting of uretdione, isocyanurate, allophanate, biuret, iminooxadiazinedione and oxadiazinetrione structure present in the polyisocyanate composition A), less than 50 mol %, preferably less than 40 mol %, more preferably less than 30 mol % and preferably less than 20 mol %, 10 mol % or 5 mol % of isocyanurate structures. A further embodiment of the invention envisages the use of a polymer composition A) of a single defined oligomeric structure type, said oligomeric structure type being selected from the group consisting of uretdione, allophanate, biuret, iminooxadiazinedione and/or oxadiazinetrione structure and this structure type being present to an extent of at least 50 mol %, preferably 60 mol %, more preferably 70 mol %, especially preferably 80 mol % and particularly 90 mol %, based on the sum total of the oligomeric structures from the group consisting of uretdione, isocyanurate, allophanate, biuret, iminooxadiazinedione and oxadiazinetrione structure present in the polyisocyanate composition A).

The proportions of uretdione, isocyanurate, allophanate, biuret, iminooxadiazinedione and/or oxadiazinetrione structure in the polyisocyanate composition A) can be determined, for example, by NMR spectroscopy. Preferably, it is possible here to use $^{13}C$ NMR spectroscopy, preferably in proton-decoupled form, since the oligomeric structures mentioned give characteristic signals.

Irrespective of the underlying oligomeric structure type (uretdione, isocyanurate, allophanate, biuret, iminooxadiazinedione and/or oxadiazinetrione structure), the oligomeric polyisocyanate composition A) for use in the process according to the invention and/or the oligomeric polyisocyanates present therein preferably have a (mean) NCO functionality of 2.0 to 5.0, preferably of 2.3 to 4.5.

Results of particular practical relevance are established when the polyisocyanate composition A) to be used in accordance with the invention has a content of isocyanate groups of 8.0% to 28.0% by weight. It has been found to be of particular practical relevance when the polyisocyanate composition A) according to the invention has a content of isocyanate groups of 14.0% to 25.0% by weight, based in each case on the weight of the polyisocyanate composition A).

Preparation processes for the oligomeric polyisocyanates having uretdione, isocyanurate, allophanate, biuret, iminooxadiazinedione and/or oxadiazinetrione structure that are to be used in accordance with the invention in the low-monomer polyisocyanate composition A) are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate composition A) according to the invention is defined in that it contains oligomeric polyisocyanates which have been obtained from monomeric diisocyanates, irrespective of the nature of the modification reaction used, with observation of an oligomerization level of 5% to 45%, preferably 10% to 40%, more preferably 15% to 30%. "Oligomerization level" is understood here to mean the percentage of isocyanate groups originally present in the starting mixture which are consumed during the preparation process to form uretdione, isocyanurate, allophanate, biuret, iminooxadiazinedione and/or oxadiazinetrione structures.

Suitable polyisocyanates for production of the polyisocyanate composition A) for use in the process according to the invention and the oligomeric polyisocyanates present therein are any desired polyisocyanates obtainable in various ways, for example by phosgenation in the liquid or gas phase or by a phosgene-free route, for example by thermal urethane cleavage. Particularly good results are established when the polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane, 1,3- and 1,4-bis(isocyanatomethyl)cyclohexane, bis(isocyanatomethyl)norbornane, 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates which are likewise suitable are additionally found, for example, in *Justus Liebigs Annalen der Chemie Volume* 562 (1949) p. 75-136.

Suitable monomeric monoisocyanates which can optionally be used in the polyisocyanate composition A) are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the polyisocyanate composition A) is 4-isocyanatomethyloctane 1,8-diisocyanate (triisocyanatononane; TIN).

In one embodiment of the invention, the polyisocyanate composition A) contains not more than 30% by weight, especially not more than 20% by weight, not more than 15% by weight, not more than 10% by weight, not more than 5% by weight or not more than 1% by weight, based in each case on the weight of the polyisocyanate composition A), of aromatic polyisocyanates. As used here, "aromatic polyisocyanate" means a polyisocyanate having at least one aromatically bonded isocyanate group.

In a preferred embodiment of the process according to the invention, a polyisocyanate composition A) having exclusively aliphatically and/or cycloaliphatically bonded isocyanate groups is used.

Aliphatically and cycloaliphatically bonded isocyanate groups are respectively understood to mean isocyanate groups bonded to an aliphatic and cycloaliphatic hydrocarbyl radical.

In another preferred embodiment of the process according to the invention, a polyisocyanate composition A) consisting of or comprising one or more oligomeric polyisocyanates is used, where the one or more oligomeric polyisocyanates has/have exclusively aliphatically and/or cycloaliphatically bonded isocyanate groups.

In a further embodiment of the invention, the polyisocyanate composition A) consists to an extent of at least 70%, 80%, 85%, 90%, 95%, 98% or 99% by weight, based in each case on the weight of the polyisocyanate composition A), of polyisocyanates having exclusively aliphatically and/or cycloaliphatically bonded isocyanate groups. Practical experiments have shown that particularly good results can be achieved with polyisocyanate compositions A) in which the oligomeric polyisocyanates present therein have exclusively aliphatically and/or cycloaliphatically bonded isocyanate groups.

In a particularly preferred embodiment of the process according to the invention, a polyisocyanate composition A) is used which consists of or comprises one or more oligomeric polyisocyanates, where the one or more oligomeric polyisocyanates is/are based on 1,5-diisocyanatopentane, (PDI), 1,6-diisocyanatohexane (HDI), isophorone diisocyanate (IPDI) or 4,4'-diisocyanatodicyclohexylmethane or mixtures thereof.

The polyisocyanurates according to the invention are obtainable by catalytic trimerization by the process according to the invention. "Catalytic" means in the presence of at least one tertiary organic phosphine catalyst B).

A tertiary organic phosphine catalyst is a catalyst containing or consisting of at least one tertiary organic phosphine. In the context of the invention, a tertiary organic phosphine is especially understood to mean a compound having a trivalent phosphorus to which organic substituents are bonded. Organic substituents are understood to mean especially alkyl groups, cycloalkyl groups, aralkyl groups or aryl groups, where the aryl groups may optionally be substituted.

According to the invention, alkyl groups are understood to mean those groups that have up to 10 and preferably 2 to 8 carbon atoms and are linear or branched. Specifically, this definition includes, for example, the meanings of methyl, ethyl, n-, isopropyl, n-, iso-, sec- and t-butyl, n-pentyl, n-hexyl, 1,3-dimethylbutyl, 3,3-dimethylbutyl, n-heptyl, n-octyl, n-nonyl, n-decyl.

In the context of the invention, the term "cycloalkyl group" is understood to mean a cyclic saturated group having up to 10 and preferably 3 to 8 carbon atoms. Cycloalkyl groups of this kind are, for example, cyclopropyl, cyclobutyl, cyclopentyl, cyclohexyl, cycloheptyl, norbornyl, adamantyl.

Aralkyl groups refer in accordance with the invention to aryl-substituted alkyl groups having up to 12 and preferably 7 to 10 carbon atoms. Aralkyl groups of this kind are, for example, benzyl, phenethyl, 2- and 3-phenylpropyl, 2-benzylpropyl, 1- and 2-naphthylethyl.

In the context of the invention, an aryl group is understood to mean a mono- or bicyclic unsaturated group having cyclically delocalized electrons and having 6 to 10 and preferably 6 carbon atoms. Examples of an aryl group are phenyl, naphthyl. According to the invention, the aryl group may be alkyl-substituted, i.e. substituted by an alkyl group having up to 10 and preferably having 1 to 6 carbon atoms. Examples of optional alkyl group substituents of this kind for the aryl group are methyl, ethyl, n-, isopropyl, n-, iso-, sec- and t-butyl, n-pentyl, n-hexyl, 1,3-dimethylbutyl, 3,3-dimethylbutyl, n-heptyl, n-octyl, n-nonyl, n-decyl.

Two organic substituents, especially those that are aliphatic in nature, can also be joined to one another to form a heterocyclic ring together with the phosphorus atom. A heterocyclic ring as used here is understood to mean a ring having 4 to 6 ring members, such as cyclobutane, cyclopentane or cyclohexane, in which one carbon atom has been replaced by the phosphorus atom of the tertiary organic phosphine catalyst.

Suitable tertiary organic phosphine catalysts B) for the process according to the invention are in principle all tertiary organic phosphines which accelerate the trimerization of isocyanate groups to isocyanurate structures. Since isocyanurate formation, depending on the catalyst used, is frequently accompanied by side reactions, for example dimerization to give uretdione structures or trimerization to form iminooxadiazinediones (called asymmetric trimers), and by allophanatization reactions in the case of presence of urethane groups in the starting polyisocyanate, the term "trimerization" shall also synonymously represent these reactions that proceed additionally in the context of the present invention.

In a particular embodiment, however, trimerization means that predominantly cyclotrimerizations of at least 50%, preferably at least 60%, more preferably at least 70% and especially at least 80% of isocyanate groups present in the polyisocyanate composition A) to give isocyanurate structural units are catalysed. However, side reactions, especially those to give uretdione, allophanate and/or iminooxadiazinedione structures, typically occur and can even be used in a controlled manner in order to advantageously affect, for example, the Tg of the polyisocyanurate plastic obtained.

In a preferred embodiment of the process according to the invention, tertiary organic phosphine catalysts B) used are tertiary organic phosphines of the general formula (I)

(I)

in which

R1, R2 and R3 are identical or different radicals and are each an alkyl or cycloalkyl group having up to 10 carbon atoms, preferably an alkyl group having 2 to 8 carbon atoms or a cycloalkyl group having 3 to 8 carbon atoms, an aralkyl group having 7 to 10 and preferably 7 carbon atoms, or an aryl group which has 6 to 10 and preferably 6 carbon atoms and is optionally substituted by alkyl radicals having up to 10 and preferably 1 to 6 carbon atoms, with the proviso that not more than one of the radicals is an aryl group and at least one of the radicals is an alkyl or cycloalkyl group, or in which R1 and R2 are aliphatic in nature and, joined to one another, together with the phosphorus atom form a heterocyclic ring having 4 to 6 ring members, where R3 is an alkyl group having up to 4 carbon atoms, or mixtures of such tertiary organic phosphine catalysts B) of the general formula (I).

Suitable tertiary organic phosphine catalysts B) are, for example, tertiary phosphines having linear aliphatic substituents, such as trimethylphosphine, triethylphosphine, tri-n-propylphosphine, tripropylphosphine, dibutylethylphosphine, tri-n-butylphosphine, triisobutylphosphine, tri-tert-bulylphosphine, penlytdimelhylphosphine, penlyldiethylphosphine, pentyldipropylphosphine, pentyldibutylphosphine, penlykJihexylphosphine, dipentytmethyl phosphine, dipentylelhylphosphine, dipentyl propyl phosphine, dipentyibutylphosphine, dipenlylhexylphosphine, dipentytoctylphosphine, thpentylphosphine, hexyldimethylphosphine, hexytdiethylphosphine, hexyldipropylphosphine, hexytdibutylphosphine, dihexylmethylphosphine, dihexylethylphosphine, dihexylpropylphosphine, dihexylbutylphosphine, trihexylphosphine, trioctylphosphine, tribenzylphosphine, benzyldim ethyl phosphine, dimethylphenylphosphine or butylphosphacyclopentane.

Further tertiary organic phosphine catalysts B) that are suitable for the process according to the invention are, for example, also the tertiary phosphines known from EP 1 422 223 A1 that have at least one cycloaliphatic radical bonded directly to phosphorus, for example cydopentyldimethylphosphine, cyclopentyldiethylphosphine, cyclopentyldi-n-propylphosphine, cyclopentyldiisopropylphosphine, cyclopentyldibutylphosphine with any isomeric butyl radicals, cyclopentytdihexylphosphine with any isomeric hexyl radicals, cydopentyldioctylphosphine with any isomeric octyl radicals, dicyctopentylmethylpbosphine, dicyclopentylethytphosphine, dicyclopentyl-n-propylphosphine, dicyclopentylisopropylphosphine, dicyclopentylbutylphosphine with any isomeric butyl radical, dicyclopenlylhexylphosphine with any isomeric hexyl radical, dicyclopentyloctylphosphine with any isomeric octyl radical, tricyclopentylphosphine, cyclohexyldimethylphosphine, cyclohexyldiethylphosphinem cyclohexyldi-n-propylphosphine, cyclohexyldiisopropylphosphine, cyclohexyldibutylphosphines with any isomeric butyl radicals, cyclohexyldihexylphosphine with any isomeric hexyl radicals, cyclohexyldioctylphosphine with any isomeric octyl radicals, dicyctohexylmethylphosphine, dicyclohexylethylphosphine, dicyclohexyl-n-propylphosphine, dicyclohexylisopropylphosphine, dicyclohexylbutylphosphine with any isomeric butyl radical, dicyclohexylhexylphosphine with any isomeric hexyl radical, dicyclohexyloctylphosphine with any isomeric octyl radical, and tricyclohexylphosphine.

Further suitable tertiary organic phosphine catalysts B) for the process according to the invention are, for example, also the tertiary phosphines that are known from EP 1 982 979 A1 and have one or two tertiary alkyl radicals bonded directly to phosphorus, for example tert-butyldimethylphosphine, tert-butyldiethylphosphine, tert-butyldi-n-propylphosphine, tert-butylditsopropylphosphine, tert-butyldibutylphosphines with any isomeric butyl radicals for the non-tertiary butyl radicals, tert-butyldihexyl phosphines with any isomeric hexyl radicals, but where not more than one of the hexyl radicals has a tertiary carbon atom bonded directly to phosphorus, tert-butyldioctylphosphines with any isomeric octyl radicals, but where not more than one of the octyl radicals has a tertiary carbon atom bonded directly to phosphorus, di-tert-butylmethylphosphine, di-tert-butylethylphosphine, di-tert-butyl-n-propylphosphine, di-tert-butylisopropylphosphine, di-tert-butylbutylphosphines in which the non-tertiary butyl radical may be n-butyl, isobutyl, 2-butyl or cyclobutyl, di-tert-butylhexylphosphines with any isomeric hexyl radical having no tertiary carbon atom bonded directly to phosphorus, di-tert-butyloctylphosphines with any isomeric octyl radical having no tertiary carbon atom bonded directly to phosphorus, tert-amyldimethylphosphine, tert-amyldiethylphosphine, tert-amyldi-n-propylphosphine, tert-amyldiisopropylphosphine, tert-amyldibutylphosphines with any isomeric butyl radicals, but where not more than one of the butyl radicals is tert-butyl, tert-amyldihexylphosphines with any isomeric hexyl radicals, but where not more than one of the hexyl radicals has a tertiary carbon atom bonded directly to phosphorus, tert-amyldioctylphosphines with any isomeric octyl radicals, but where not more than one of the octyl radicals has a tertiary carbon atom bonded directly to phosphorus, di-tert-amylethylphosphine, di-tert-amylethylphosphine, di-tert-amyl-n-propylphosphine, di-tert-amylisopropylphosphine, di-tert-amylbutylphosphines in which the butyl radical may be n-butyl, isobutyl, 2-butyl or cyclobutyl, di-tert-amylhexylphosphines with any isomeric hexyl radical having no tertiary carbon atom bonded directly to phosphorus, di-tert-amyloctylphosphines with any isomeric octyl radical having no tertiary carbon atom bonded directly to phosphorus, adamantyldimethylphosphine, adamantyldiethylphosphine, adamantyldi-n-propylphosphine, adamantyldiisopropylphosphine, adamantyldibutylphosphines with any isomeric butyl radicals, but where not more than one of the butyl radicals has a tertiary carbon atom bonded directly to phosphorus, adamantyldihexylphosphines with any isomeric hexyl radicals, but where not more than one of the hexyl radicals has a tertiary carbon atom bonded directly to phosphorus, adamantyldioctylphosphines with any isomeric octyl radicals, but where not more than one of the octyl radicals has a tertiary carbon atom bonded directly to phosphorus, diadamantylmethylphosphine, diadamantylethylphosphine, diadamantyl-n-propylphosphine, diadamantylisopropylphosphine, diadamantylbutylphosphines in which the butyl radical may be n-butyl, isobutyl, 2-butyl or cyclobutyl, diadamantylhexylphosphines with any isomeric hexyl radical having no tertiary carbon atom bonded directly to phosphorus, and diadamantyloctylphosphines with any isomeric hexyl radical having no tertiary carbon atom bonded directly to phosphorus.

Preferably, in the process according to the invention, the tertiary organic phosphine catalyst B) is selected from the group of the tertiary phosphines with linear aliphatic substituents mentioned.

Very particularly preferred tertiary organic phosphine catalysts B) are tri-n-butylphosphine and/or trioctylphosphine.

In the process according to the invention, the tertiary organic phosphine catalyst B) is generally used in a concentration based on the weight of the polyisocyanate composition A) used of 0.0005% to 5.0% by weight, preferably of 0.0010% to 3.0% by weight and more preferably of 0.0015% to 2.0% by weight.

The tertiary organic phosphine catalysts B) that are used in the process according to the invention generally have sufficient solubility in the polyisocyanate composition A) in the amounts that are required for initiation of the oligomerization reaction. The catalyst B) is therefore preferably added to the polyisocyanate composition A) in neat form.

Optionally, however, the tertiary organic phosphine catalysts B) can also be used dissolved in a suitable organic solvent to improve their incorporability. The dilution level of the catalyst solutions can be chosen freely within a very wide range. Catalyst solutions of this kind are typically catalytically active over and above a concentration of about 0.01% by weight.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxy-2-propyl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulphoxide, triethyl phosphate or any desired mixtures of such solvents.

If catalyst solvents are used in the process according to the invention, preference is given to using catalyst solvents which bear groups reactive toward isocyanates and can be incorporated into the polyisocyanurate resin. Examples of such solvents are mono- or polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethylallyl alcohol oleyl alcohol; araliphatic alcohols, for example benzyl alcohol; N-monosubstituted amides, for example N-methylformamide, N-methylacetamide, cyanoacetamide or 2-pyrrolidinone, or any desired mixtures of such solvents.

The polyisocyanurate plastics obtainable by the process according to the invention, even as such, i.e. without addition of appropriate auxiliaries and additives C), feature very good light stability. Nevertheless, it is optionally possible to use standard auxiliaries and additives C) as well in the production thereof, for example standard fillers $C_w$), UV stabilizers $C_x$), antioxidants $C_y$), mould release agents $C_z$), water scavengers, slip additives, defoamers, levelling agents, rheology additives, flame retardants and/or pigments. These auxiliaries and additives C), excluding fillers and flame retardants, are typically present in the polyisocyanurate plastic in an amount of less than 10% by weight, preferably less than 5% by weight, more preferably up to 3% by weight, based on the polyisocyanate composition A). Flame retardants are typically present in the polyisocyanurate plastic in amounts of not more than 70% by weight, preferably not more than 50% by weight and more preferably not more than 30% by weight, calculated as the total amount of flame retardants used, based on the total weight of the polyisocyanate composition A).

Suitable fillers $C_w$) are, for example, glass fibres, carbon fibres, ceramic fibres, nylon fibres, aramid fibres, but also $AlOH_3$, $CaCO_3$, metal pigments such as $TiO_2$ and further known standard fillers. These fillers $C_w$) are preferably used in amounts of not more than 70% by weight, preferably not more than 50% by weight, more preferably not more than 30% by weight, calculated as the total amount of fillers used, based on the total weight of the polyisocyanate composition A).

Suitable UV stabilizers $C_x$) may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl) phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnannate, butyl α-cyano-β-methyl-4-methoxycinnannate, ethyl α-cyano-β-phenylcinnamate, isooctyl α-cyano-β-phenylcinnamate; and nnalonic ester derivatives, such as dimethyl 4-methoxybenzylidenennalonate, diethyl 4-methoxybenzylidenemalonate, dimethyl 4 butoxybenzylidenennalonate. These preferred light stabilizers may be employed either individually or in any desired combinations with one another.

Particularly preferred UV stabilizers $C_x$) for the polyisocyanurate plastics producible in accordance with the invention are those which fully absorb radiation of wavelength <400 nm. These include, for example, the benzotriazole derivatives mentioned. Very particularly preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

It is optionally possible to add one or more of the UV stabilizers $C_x$) mentioned by way of example to the polyisocyanate composition A), preferably in amounts of 0.001% to 3.0% by weight, more preferably 0.01% to 2% by weight, calculated as the total amount of UV stabilizers used, based on the total weight of the polyisocyanate composition A).

Suitable antioxidants $C_y$) are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. If required, they can be used either individually or in any desired combinations with one another.

These antioxidants $C_y$) are preferably used in amounts of 0.01% to 3.0% by weight, more preferably 0.02% to 2.0% by weight, calculated as the total weight of the amount of antioxidants used, based on the total weight of the polyisocyanate composition A).

The process according to the invention can, apart from the small amounts of any catalyst solvents to be used in addition, be conducted in a solvent-free manner. Especially in the case of the inventive use for production of coatings or films, the polyisocyanate component can optionally also be diluted with organic solvents to reduce the processing viscosity. Solvents suitable for the purpose are, for example, the catalyst solvents inert toward isocyanate groups that have already been described above.

In the case of the inventive use for production of films, semifinished products or mouldings, finally, further auxiliaries and additives C) added may also be internal mould release agents $C_z$).

These are preferably the nonionic surfactants that contain perfluoroalkyl or polysiloxane units and are known as mould release agents, quaternary alkyl ammonium salts, for example trimethylethylammonium chloride, trimethylstearylammonium chloride, dimethylethylcetylammonium chloride, triethyldodecylammonium chloride, trioctylmethylammonium chloride and diethylcyclohexyldodecylammonium chloride, acidic mono- and dialkyl phosphates having 2 to 18 carbon atoms in the alkyl radical, for example ethyl phosphate, diethyl phosphate, isopropyl phosphate, diisopropyl phosphate, butyl phosphate, dibutyl phosphate, octyl phosphate, dioctyl phosphate, isodecyl phosphate, diisodecyl phosphate, dodecyl phosphate, didodecyl phosphate, tridecanol phosphate, bis(tridecanol) phosphate, stearyl phosphate, distearyl phosphate, and any desired mixtures of such mould release agents.

Particularly preferred mould release agents $C_z$) are the acidic mono- and dialkyl phosphates mentioned, most preferably those having 8 to 12 carbon atoms in the alkyl radical.

Internal mould release agents $C_z$) are used in the process according to the invention, if appropriate, preferably in amounts of 0.01% to 3.0% by weight, more preferably 0.02% to 2.0% by weight, calculated as the total weight of the internal mould release agents used, based on the total weight of the polyisocyanate composition A).

For performance of the process according to the invention, the polyisocyanate composition A) described, optionally but not necessarily under inert gas, for example nitrogen, and optionally with additional use of the aforementioned solvents and auxiliaries and additives C), a tertiary organic phosphine catalyst B) or a mixture of different tertiary organic phosphine catalysts B) of this kind is added and is mixed in homogeneously with the aid of a suitable mixing unit. The addition of the tertiary organic phosphine catalyst B) and of any solvent for additional use and of auxiliaries and additives C) takes place in any sequence, successively or in a mixture, in the above-specified amounts, generally at a temperature of 0 to 100° C., preferably of 15 to 80° C., more preferably of 20 to 60'C.

It is preferable that the mixture does not contain any catalyst that accelerates the reaction of isocyanate groups with water in a catalytically active amount. It is especially preferable that the mixture does not contain any tin compounds, for example tin(II) octoate or dibutyltin dilaurate.

The catalysed reaction mixtures thus obtained, according to the end use, can be applied by different methods that are known per se. For production of films or coatings, for example lacquers, a mixture of tertiary organic phosphine catalyst B) and polyisocyanate composition A) can be applied, for example, by spraying, painting, dipping, flow-coating, or with the aid of brushes, rollers or coating bars, in one or more layers, directly to any substrates, for example metal, wood, glass, stone, ceramic materials, concrete, hard and flexible plastics, textiles, leather and paper, and these can optionally also be provided with standard primers prior to the coating.

For production of solid components, for example semifinished products or mouldings, the mixture of tertiary organic phosphine catalyst B) and polyisocyanate composition A) can be introduced into open or closed moulds, for example, by simple manual pouring, or with the aid of suitable machinery, for example the low-pressure or high-pressure machinery which is standard in polyurethane technology.

The phosphine-catalysed trimerization reaction generally already sets in at low temperatures and proceeds very homogeneously without apparent exothermicity. By heating, for example, of the coated substrates or filled moulds, the trimerization can optionally be accelerated, where the optimal reaction temperature, depending on the catalyst selected in each case, is from −20 to 200° C., preferably from 10 to 160° C., mor e preferably from 20 to 130° C. The reaction temperature can be kept constant within the range specified over the entire curing process to give the polyisocyanurate, or else can be heated, for example, in a linear or stepwise manner up to a temperature greater than 80° C., preferably greater than 100° C., for example up to 130° C., over several hours or days.

In a preferred embodiment of the invention, the hardening is effected at room temperature, "room temperature" being understood to mean the temperature range between 0° C. and 100° C., preferably between 0° C. and 80° C. and more preferably between 0° C. and 60° C.

When the aim is to obtain products having an elevated glass transition temperature, the hardening is preferably effected at more than 100° C., preferably more than 120° C. However, this can lead to products with significant yellowing (see Example 9). If this effect is to be avoided, it is preferable to conduct the hardening at room temperature until the reaction mixture is no longer tacky, and only thereafter to raise the temperature to the aforementioned values. As Example 5 shows, yellowing of the product is prevented in this way.

The use of the phosphine catalysts according to the invention has the great advantage that the trimerization reaction can also be conducted in the presence of air humidity and even in direct contact with water. Consequently, process step b), in a preferred embodiment of the present invention, is effected at a relative air humidity that does not permit blister-free curing of the reaction mixture using tin catalysts, for example tin(II) octoate or dibutyltin dilaurate. Preferably, the trimerization is effected at a relative air humidity of at least 20%, more preferably at least 30%, even more preferably at least 40% and most preferably at least 50%. Likewise preferably, the hardening is effected in the presence of liquid water. The hardening here is preferably effected at a temperature between 0° C. and 80° C.

It is even possible to conduct the trimerization reaction in process step b) in direct contact with liquid water and not just water vapour, without formation of blisters in the cured product. It is even possible to conduct process step b) completely underwater. Consequently, process step b), in a particularly preferred embodiment of the present invention, is conducted at a relative air humidity of at least 75% or in direct contact with liquid water. The hardening here is preferably effected at a temperature between 0° C. and 80° C.

Depending on the tertiary organic phosphine catalyst B) chosen, the catalyst concentration and the reaction temperature chosen, the trimerization reaction is complete after a period of a few hours or only after a few days. The progress of the reaction can initially still be monitored by titrimetric determination of the NCO content, but gelation and solidification of the reaction mixture sets in rapidly as the reaction progresses, which makes wet-chemical analysis methods impossible. The further conversion of isocyanate groups can then be monitored only by spectroscopic methods, for example by IR spectroscopy with reference to the intensity of isocyanate band at about 2270 cm$^{-1}$.

The polyisocyanurate plastics obtainable by the process according to the invention are preferably polyisocyanurates with a high degree of conversion, i.e. those in which the trimerization reaction to give polyisocyanurate structures is very substantially complete. A trimerization reaction to give polyisocyanurate structures can be regarded as "very substantially complete" in the context of the present invention when at least 80%, preferably at least 90%, more preferably at least 95%, of the free isocyanate groups originally present in the polyisocyanate composition A) have reacted. In other words, there are preferably not more than 20%, not more than 10%, more preferably not more than 5%, of the isocyanate groups originally present in the polyisocyanate composition A) in the polyisocyanurate plastic according to the invention. This can be achieved by continuing the catalytic trimerization in the process according to the invention at least up to a conversion level at which only, for example, not more than 20% of the isocyanate groups originally present in the polyisocyanate composition A) are present, such that a polyisocyanurate with high conversion is obtained. The percentage of isocyanate groups still present can be determined by comparison of the content of isocyanate groups in % by weight in the original polyisocyanate composition A) with the content of isocyanate groups in % by weight in the reaction product, for example by the aforementioned comparison of the intensity of the isocyanate band at about 2270 cm$^{-1}$ by means of IR spectroscopy.

The invention also relates to the polyisocyanurate plastics obtainable by the process according to the invention. These differ from those from the prior art, inter alia, in that they are transparent, blister-free and yellowing-stable. According to the nature of the starting polyisocyanate used, they also optionally contain further oligomeric structures as well as isocyanurate structures and are notable for excellent thermal stabilities. It is a further characteristic of the polyisocyanurate plastics according to the invention that the tertiary organic phosphine catalyst B) used for production of the polyisocyanurate plastic remains in the polyisocyanurate plastic.

The process according to the invention enables synthesis, in a simple manner, through suitable selection of starting polyisocyanates of different oligomeric structures, of polyisocyanurate plastics having different properties, for example different hardness levels, mechanical properties or glass transition temperatures.

The processes described in the prior art for production of polyisocyanurate plastics in which very substantially monomeric diisocyanates or monomer-rich polyisocyanate compositions are used as reactants require high apparatus complexity for complete exclusion of air humidity during the trimerization reaction for avoidance of reaction blisters and turbidity.

By contrast, the inventive use or the "provision" of a low-monomer polyisocyanate composition A) already containing oligomeric polyisocyanates, in the case of use of tertiary organic phosphine catalysts B) as trimerization catalysts, even under non-inert conditions and even in direct contact with liquid water, surprisingly leads to clear, fully transparent polyisocyanurate plastics of excellent suitability for optical applications. The low exothermicity of the reaction according to the invention also permits the problem-free production of solid mouldings of large volume.

The invention is elucidated in detail hereinafter with reference to examples.

EXAMPLES

All reported percentages are based on weight unless otherwise stated.

The NCO contents were determined by titrimetry as per DIN EN ISO 11909.

The residual monomer contents were measured to DIN EN ISO 10283 by gas chromatography with an internal standard.

All the viscosity measurements were made with a Physica MCR 51 rheometer from Anton Paar Germany GmbH (Germany) to DIN EN ISO 3219.

The contents (mol %) of the uretdione, isocyanurate, allophanate, biuret, iminooxadiazinedione and/or oxadiazinetrione structures present in the starting polyisocyanates were calculated from the integrals of proton-decoupled $^{13}$C NMR spectra (recorded on a Bruker DPX-400 instrument) and are each based on the sum total of uretdione, isocyanurate, allophanate, biuret, iminooxadiazinedione and/or oxadiazinetrione structures present. In the case of HDI polyisocyanates, the individual structural elements have the following chemical shifts (in ppm): uretdione: 157.1; isocyanurate: 148.4; allophanate: 155.7 and 153.8, biuret: 155.5; iminooxadiazinedione: 147.8, 144.3 and 135.3; oxadiazinetrione: 147.8 and 143.9.

The glass transition temperature Tg was determined by means of DSC (differential scanning calorimetry) with a Mettler DSC 12E (Mettler Toledo GmbH, Giessen, Germany) at a heating rate of 20° C./min.

Shore hardnesses were measured to DIN 53505 with the aid of a Zwick 3100 Shore hardness tester (from Zwick, Germany).

IR spectra were recorded on a Spectrum Two FT-IR spectrometer equipped with an ATR unit, from Perkin Elmer, Inc.

Starting Compounds

Starting Polyisocyanate A1)

For use as polyisocyanate composition A), the starting polyisocyanate A1) prepared was an HDI polyisocyanate containing isocyanurate groups, prepared in accordance with Example 11 of EP-A 330 966. The reaction was stopped at an NCO content of the crude mixture of 40% by adding dibutyl phosphate. Subsequently, unconverted HDI was removed by thin-film distillation at a temperature of 130° C. and a pressu re of 0.2 mbar.

NCO content: 21.8%
NCO functionality: 3.4
Monomeric HDI: 0.1%
Viscosity (23° C.): 3000 mPas
Density (20° C.): 1.17 g/cm$^3$
Distribution of the oligomeric structure types:
Isocyanurate: 84.5 mol %
Iminooxadiazinedione 5.4 mol %
Uretdione 2.9 mol %
Allophanate: 7.2 mol %

Starting Polyisocyanate A2)

For use as polyisocyanate composition A), the starting polyisocyanate A2) used was an HDI polyisocyanate containing biuret groups, prepared in accordance with the process of EP-A 0 150 769, by reaction of 8.2 mol of HDI with 1.0 mol of water in the presence of 0.05 mol of pivalic anhydride at a temperature of 125° C. On attainment of an NCO content of 36.6%, unconverted HDI was removed together with pivalic anhydride by thin-film distillation at a temperature of 130° C. and a pressure of 0.2 mbar.

NCO content: 23.0%
NCO functionality: 3.2
Monomeric HDI: 0.4%
Viscosity (23° C.): 2500 mPas
Distribution of the oligomeric structure types:
Biuret: 87.7 mol %
Uretdione 12.3 mol %
Starting Polyisocyanate A3)

For use as polyisocyanate composition A), the starting polyisocyanate A3) prepared was an HDI polyisocyanate containing allophanate and isocyanurate groups, prepared according to Example 1 of EP-A 496 208.

NCO content: 19.8%
NCO functionality: 2.5
Monomeric HDI: 0.3%
Viscosity (23° C.): 570 mPas
Distribution of the oligomeric structure types:
Isocyanurate: 33.1 mol %
Allophanate: 66.9 mol %
Starting Polyisocyanate A4)

For use as polyisocyanate composition A), the starting polyisocyanate A4) prepared was an HDI polyisocyanate containing isocyanurate and iminooxadiazinedione groups, prepared in accordance with Example 4 of EP-A 0 962 455, by trimerization of HDI using a 50% solution of tetrabutylphosphonium hydrogendifluoride in isopropanol/methanol (2:1) as catalyst. The reaction was stopped at an NCO content of the crude mixture of 43% by adding dibutyl phosphate. Subsequently, unconverted HDI was removed by thin-film distillation at a temperature of 130° C. and a pressure of 0.2 mbar.

NCO content: 23.4%
NCO functionality: 3.2
Monomeric HDI: 0.2%
Viscosity (23° C.): 700 mPas
Distribution of the oligomeric structure types:
Isocyanurate: 49.9 mol %
Iminooxadiazinedione 45.3 mol %
Uretdione 4.8 mol %

Example 1 (Inventive)

25 g of the starting polyisocyanate A1) were weighed into a polypropylene cup together with 0.25 g of tributylphosphine (1% by weight) and homogenized at 3500 rpm with the aid of a Speed-Mixer DAC 150 FVZ (from Hauschild, Germany) for 1 min. The reaction mixture was poured onto a glass plate in a layer thickness of about 2 mm and laid out for drying in the open at a temperature of about 24° C. and a relative air humidity of about 44%. After one day, the colourless transparent coating was dry to the touch. After three days, no isocyanate groups (band at 2270 cm$^{-1}$) were detectable any longer by IR spectroscopy. The Shore hardness D was 75.

Example 2 (Comparative)

25 g of the starting polyisocyanate A1) were weighed into a polypropylene cup together with 0.25 g of tin(II) octoate (1% by weight) and homogenized at 3500 rpm with the aid of a Speed-Mixer DAC 150 FVZ (from Hauschild, Germany) for 1 min. The reaction mixture was poured onto a glass plate in a layer thickness of about 2 mm and laid out for drying in the open under the same conditions as in Example 1 (temperature about 24° C.; relative air humidity about 44%). After one day, the colourless coating was dry but highly foamed. By IR spectroscopy, after three days, no isocyanate groups (band at 2270 cm$^{-1}$) were detectable any longer.

Example 3 (Comparative)

25 g of the starting polyisocyanate A1) were weighed into a polypropylene cup together with 0.25 g of tributylphosphine (1% by weight) and 0.25 g of dibutyltin dilaurate and homogenized at 3500 rpm with the aid of a Speed-Mixer DAC 150 FVZ (from Hauschild, Germany) for 1 min. The reaction mixture was poured onto a glass plate in a layer thickness of about 2 mm and laid out for drying in the open under the same conditions as in Example 1 (temperature about 24° C.; relative air humidity about 44%). After one day, the colourless coating was dry but cloudy, and exhibited a multitude of blisters. By IR spectroscopy, after three days, no isocyanate groups (band at 2270 cm$^{-1}$) were detectable any longer.

Comparison of Examples 1 to 3 shows that the process according to the invention (Example 1) with catalysis with a tertiary organic phosphine catalyst in the presence of air humidity affords an entirely transparent, blister-free polyisocyanurate plastic, whereas the use of a tin catalyst known from the prior art (Example 2), and likewise the simultaneous use of a tertiary organic phosphine catalyst and a tin catalyst, under otherwise identical trimerization conditions, leads to a polyisocyanurate material which foams because of the carbon dioxide formed in the isocyanate/water reaction, which is the reason why a multitude of blisters occur in the polyisocyanurate plastic obtained.

Examples 4 to 8 (Inventive)

By the process described in Example 1, 25 g in each case of the starting polyisocyanates A1) to A4) were mixed with different amounts of different phosphine catalysts and trimerized in an open polypropylene mould to give polyisocyanurate plastics.

After the test specimens had been demoulded, by IR spectroscopy, isocyanate groups (band at 2270 cm$^{-1}$) were no longer detectable in any of the products obtained.

The following table shows the compositions of the reaction mixtures, reaction conditions and characteristic properties of the cured products:

| Example | 4 | 5 | 6 | 7 | 8 |
|---|---|---|---|---|---|
| Starting polyisocyanate | A1) | A1) | A2) | A3) | A4) |
| Tributylphosphine [% by wt.] | — | — | 1 | 1 | 1 |
| Trioctylphosphine [% by wt.] | 2 | 2 | — | — | — |
| Reaction temperature [° C.] | 50 | 50 | 24 | 24 | 50 |
| Curing conditions | a) | b) | a) | a) | a) |
| Appearance | colourless, clear, blister-free | | | | |
| Shore hardness D | 82 | 83 | 74 | 55 | 79 |
| Tg | 46 | 108 | 44 | 38 | 46 | a): 3 days at 50° C.
b): 3 days at 50° C. + 6 hours at 120° C.

In all cases, colourless, completely clear and blister-free polyisocyanurate bodies were obtained, which differ in terms of hardness and glass transition temperature depending on the starting polyisocyanate used and the curing conditions.

Example 9 (Inventive)

25 g of the starting polyisocyanate A1) were weighed into a polypropylene cup together with 0.50 g of trioctylphosphine (2% by weight) and homogenized at 3500 rpm with the aid of a Speed-Mixer DAC 150 FVZ (from Hauschild, Germany) for 1 min. The reaction mixture was poured onto a glass plate in a layer thickness of about 2 mm and then hardened in an oven at a temperature of 120° C. for 12 hours. A yellow-coloured but entirely transparent coating was obtained. By IR spectroscopy, no isocyanate groups (band at 2270 cm$^{-1}$) were detectable any longer. The Shore hardness D was 79.

The invention claimed is:

1. A process for producing a polyisocyanurate plastic, comprising the following steps:
    a) providing a polyisocyanate composition A) which comprises oligomeric polyisocyanates and is low in monomeric diisocyanates, "low in monomeric diisocyanates" meaning that the polyisocyanate composition A) has a content of monomeric diisocyanates of not more than 20% by weight, mixing A) with at least one tertiary organic phosphine catalyst B) of formula (I)

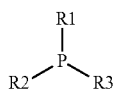

(I)

in which
    R1, R2 and R3 are identical or different radicals and are each an alkyl or cycloalkyl group having up to 10 carbon atoms, an aralkyl group having 7 to 10 carbon atoms, or an aryl group which has 6 to 10 carbon atoms, optionally substituted by alkyl radicals having up to 10 carbon atoms, with the proviso that not more than one of the radicals is an aryl group and at least one of the radicals is an alkyl or cycloalkyl group, or in which
    R1 and R2 are aliphatic and, joined to one another, together with the phosphorus atom form a heterocyclic ring having 4 to 6 ring members, where R3 is an alkyl group having up to 4 carbon atoms, forming a mixture, and
    b) catalytically trimerizing, at a relative air humidity of at least 20%, the polyisocyanate composition A) using the at least one tertiary organic phosphine catalyst B)
    and wherein the mixture does not comprise a tin compound.

2. The process according to claim 1, wherein the tertiary organic phosphine catalyst B) is selected from the group consisting of trimethylphosphine, triethylphosphine, tri-n-propylphosphine, tripropylphosphine, dibutylethylphosphine, tri-n-butylphosphine, triisobutylphosphine, tri-tert-butylphosphine, pentyldimethylphosphine, pentyldiethylphosphine, pentyldipropylphosphine, pentyldibutylphosphine, pentyldihexylphosphine, dipentylmethylphosphine, dipentylethylphosphine, dipentylpropylphosphine, dipentylbutylphosphine, dipentylhexylphosphine, dipentyloctylphosphine, tripentylphosphine, hexyldimethylphosphine, hexyldiethylphosphine, hexyldipropylphosphine, hexyldibutylphosphine, dihexylmethylphosphine, dihexylethylphosphine, dihexylpropylphosphine, dihexylbutylphosphine, trihexylphosphine, trioctylphosphine, tribenzylphosphine, benzyldimethylphosphine, dimethylphenylphosphine and butylphosphacyclopentane and mixtures of these.

3. The process according to claim 1, wherein the tertiary organic phosphine catalyst is tri-n-butylphosphine and/or trioctylphosphine.

4. The process according to claim 1, characterized in that the catalytic trimerization is conducted at least up to a conversion level at which there are only at most 20% of the isocyanate groups originally present in the polyisocyanate composition A).

5. The process according to claim 1, characterized in that the polyisocyanate composition A) consists to an extent of at least 80%, 85%, 90%, 95%, 98%, 99% or 100% by weight, based in each case on the weight of the polyisocyanate composition A), of polyisocyanates having exclusively aliphatically and/or cycloaliphatically bonded isocyanate groups.

6. The process according to claim 1, characterized in that the oligomeric polyisocyanates comprise one or more oligomeric polyisocyanates which are composed of or consist of 1,4-diisocyanatobutane, 1,5-diisocyanatopentane, 1,6-diisocyanatohexane, isophorone diisocyanate or 4,4'-diisocyanatodicyclohexylmethane or mixtures thereof.

7. The process according to claim 1, characterized in that the polyisocyanate composition A) and/or the oligomeric polyisocyanates have a mean NCO functionality of 2.0 to 5.0.

8. The process according to claim 1, characterized in that the polyisocyanate composition A) has a content of isocyanate groups of 8.0% to 28.0% by weight, based on the weight of the polyisocyanate composition A).

9. The process according to claim 1, wherein the polyisocyanate composition A) has a content of monomeric diisocyanates of not more than 15% by weight, not more than 10% by weight or not more than 5% by weight, based in each case on the weight of the polyisocyanate composition A).

* * * * *